United States Patent
Buchwald et al.

(10) Patent No.: US 7,176,398 B2
(45) Date of Patent: Feb. 13, 2007

(54) TRANSIENT SUPPRESSION DEVICE AND METHOD OF PACKAGING THE SAME

(75) Inventors: Philip Paul Buchwald, New Haven, VT (US); Mark Eastman, Winooski, VT (US); Ward J. Nial, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 242 days.

(21) Appl. No.: 10/929,999

(22) Filed: Aug. 30, 2004

(65) Prior Publication Data

US 2006/0044713 A1    Mar. 2, 2006

(51) Int. Cl.
*H01H 9/04* (2006.01)
(52) U.S. Cl. .................. 200/302.1; 200/304; 439/620; 361/56
(58) Field of Classification Search ........ 200/293–296, 200/302.1, 304, 333; 361/56; 439/620.08, 439/620.09, 620.16, 620.1
See application file for complete search history.

(56) References Cited

U.S. PATENT DOCUMENTS

| | | | | |
|---|---|---|---|---|
| 4,729,752 A | * | 3/1988 | Dawson et al. ........ | 439/620.16 |
| 5,163,853 A | * | 11/1992 | Johnescu et al. ...... | 439/620.08 |
| 5,167,537 A | * | 12/1992 | Johnescu et al. ...... | 439/620.08 |
| 5,246,388 A | * | 9/1993 | Collins et al. ......... | 439/620.08 |
| 5,599,208 A | * | 2/1997 | Ward ..................... | 439/620.09 |
| 2004/0218321 A1 | | 11/2004 | Maier | |

* cited by examiner

*Primary Examiner*—K. Lee
(74) *Attorney, Agent, or Firm*—Calfee, Halter & Griswold LLP; Peter M. Hernandez, Esq.

(57) ABSTRACT

A transient suppression device for limiting to desirable levels current and energy entering a fuel tank of an aircraft over interface wiring that penetrates a wall of the fuel tank comprises: an elongated, hollow, conductive housing capped at one end and open at another end, the housing being disposed external and in proximity to the fuel tank, and supported physically from a structure of the aircraft; a transient suppression circuit disposed within the housing and connected in series with the interface wiring; and a shield braid of conductive material disposed over the open end of the housing and covering the interface wiring over the distance between the housing and tank wall, the shield braid electrically coupling the housing to the tank wall. A method of packaging the transient suppression device is also disclosed.

14 Claims, 5 Drawing Sheets

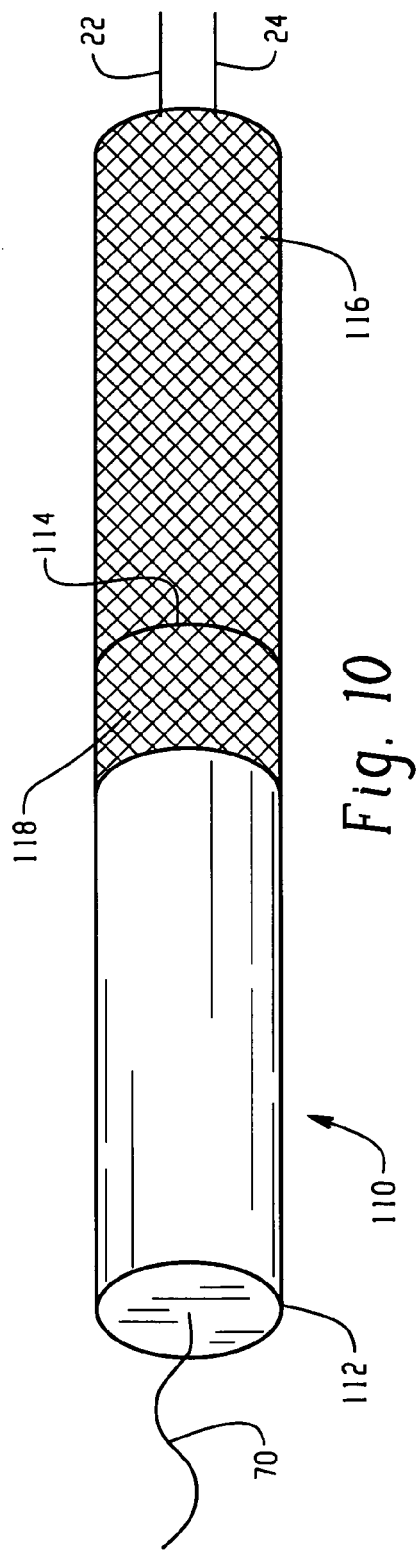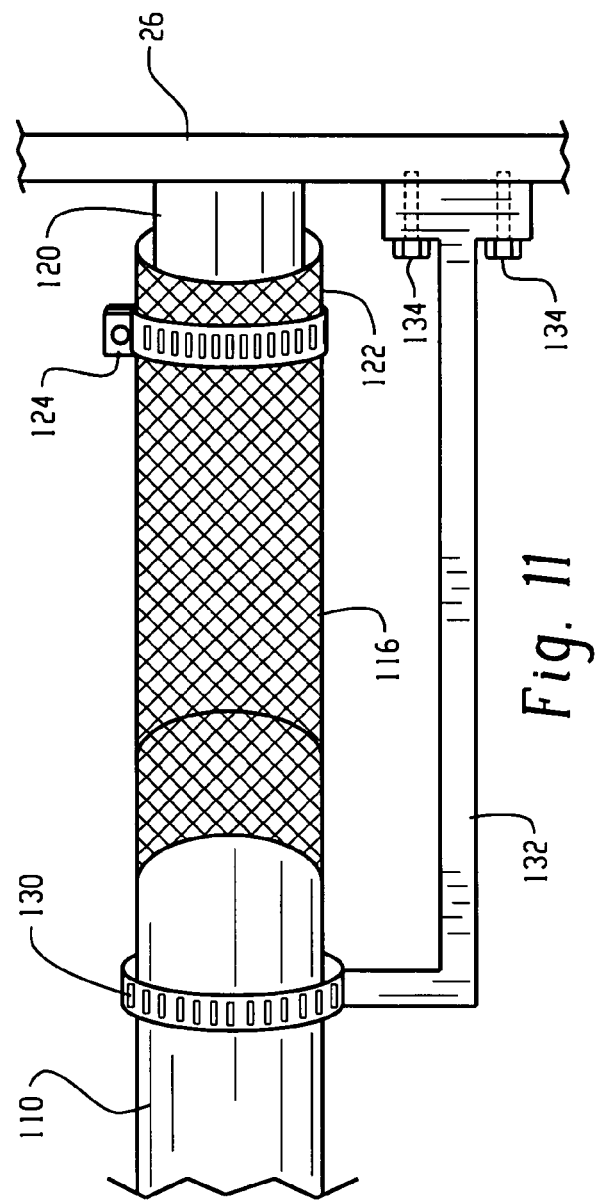
Fig. 10
Fig. 11

TRANSIENT SUPPRESSION DEVICE AND METHOD OF PACKAGING THE SAME

CROSS REFERENCE TO RELATED APPLICATIONS

U.S. patent application Ser. No. 10/695,040, entitled "Float Switch Transient Suppression Device", filed on Oct. 27, 2003, which is assigned to the same assignee as the instant application.

U.S. patent application Ser. No. 10/427,460, entitled "Apparatus and Method For Protecting The Safe Side Wiring of a Protective Barrier Against Transferring Fault Energy Into a Potentially Explosive Environment", filed May 1, 2003, which application being assigned to the same assignee as the instant application.

BACKGROUND OF THE INVENTION

The present invention relates to transient suppression devices, in general, and more particularly, to a transient suppression device (TSD) being located external and in proximity to an aircraft fuel tank for limiting to desirable levels the current and energy of signals that may enter the fuel tank over interface wiring that penetrates a wall of the fuel tank, and a method of packaging the same.

An example of a float switch application in a combustible liquid is in connection with a transport aircraft on which one or more float switches is or are disposed within a fuel tank for monitoring the fuel level thereof. The float switch may comprise a magnetic reed switch that is sealed within a tube, for example. A float within the switch tube moves with the level of fuel and renders an electrical connection when the fuel rises above or drops below a predetermined fuel level. Each float switch is electrically connected to an interface circuit external to the tank by electrical wiring which passes through a wall of the tank. The electrical wiring interconnecting the float switch with its interface circuit is disposed within a sealed conduit which keeps the wiring from making contact with the fuel.

The float switch interface circuits vary in function with the aircraft. On some aircraft, the interface circuit acts as a safety device or back-up to prevent overfilling the tank during a fueling or re-fueling process. In this application, the interface circuit comprises a shut-off valve which typically uses currents on the order of two amps maximum, for example. On other aircraft, the interface circuit functions to initiate a fuel transfer between internal tanks of the aircraft. In this application, the interface circuit comprises a fuel transfer valve which typically uses currents on the order of sixty to one-hundred milliamps, for example. In some cases, the float switch may also drive a low fuel level indicator lamp. Such drive current levels are passed into the fuel tank through the interconnecting wiring and float switch.

Under normal operating conditions, a clear separation is maintained between the switch and wiring and the fuel to avoid the possibility of fuel vapor ignition. However, there are possible internal fault conditions in which fuel vapor may make contact with the wiring and/or switch contacts. For example, the conduit seal or the sealed tube or the connection between the conduit and tube may leak permitting fuel vapor to enter the sealed chambers. Other potential fault conditions include: chafing of the wires within the conduit resulting in potential exposure to fuel vapor; and hot short to the aircraft wiring. With the current and energy levels of the present float switch designs, any one of these fault conditions poses the risk of an explosive reaction.

Another area of concern is with external threats, like lightning, high voltage wiring shorts, and high intensity radiated fields, for example, passing unsafe current and/or energy levels into the tank through the interconnecting switch wiring.

The Federal Aviation Administration or FAA has been considering these potentially threatening conditions and is on the verge of promulgating mandatory regulations to limit the current and energy levels permitted to pass into an aircraft fuel tank under any conditions, including normal operating conditions. These regulated levels of current and/or energy are intended to prevent an ignition of in-tank fuel vapors under all possible conditions. Under the anticipated FAA regulations, current levels of less than ten milliamps are considered safe, but current levels from ten to thirty milliamps will require an explanation of safeness. RMS current levels greater than thirty milliamps are considered unsafe under the anticipated regulations. In addition, the anticipated FAA regulations limit the energy permitted to enter the tank to less than two-hundred microjoules.

Accordingly, in order to comply with the anticipated FAA regulations, it may be necessary to modify the present float switch system on aircraft to reduce the normal in-tank operating current and energy of such systems while maintaining the current and energy needed to drive the interface electronics for all possible applications, and to protect against potentially threatening conditions as noted above. The present invention is intended to provide for these modifications.

SUMMARY OF THE INVENTION

In accordance with one aspect of the present invention, a transient suppression device for limiting to desirable levels current and energy entering a fuel tank of an aircraft over interface wiring that penetrates a wall of the fuel tank comprises: an elongated, hollow, conductive housing capped at one end and open at another end, the housing being disposed external and in proximity to the fuel tank, and supported physically from a structure of the aircraft; a transient suppression circuit disposed within the housing and connected in series with the interface wiring; and a shield braid of conductive material disposed over the open end of the housing and covering the interface wiring over the distance between the housing and tank wall, the shield braid electrically coupling the housing to the tank wall.

In accordance with another aspect of the present invention, a method of packaging a transient suppression device on board an aircraft to limit to desirable levels current and energy entering a fuel tank of an aircraft over interface wiring that penetrates a wall of the fuel tank comprises the steps of: disposing circuitry of the transient suppression device into an elongated, hollow conductive housing; capping one end of the housing; passing interface wiring that is exposed to potential threats into the housing through an aperture in the capped end thereof; connecting the exposed interface wiring to an unprotected side of the transient suppression circuitry; passing interface wiring that penetrates a wall of the fuel tank into the housing through an open end thereof; connecting the wall penetration interface wiring to a protected side of the transient suppression circuitry; covering the wall penetration wiring between the housing and the tank wall with a conductive shield braid; securing the shield braid to the housing and tank wall to form an electrical coupling therebetween; and physically supporting the housing from a structure of the aircraft at a location external and in proximity to the tank wall.

BRIEF DESCRIPTION OF THE DRAWINGS

FIG. 10 is an illustration of an exemplary package of a transient suppression device in accordance with the present invention.

FIG. 11 is an illustration of the transient suppression device package used in an aircraft fuel tank embodiment.

DETAILED DESCRIPTION OF THE INVENTION

Figure 1:
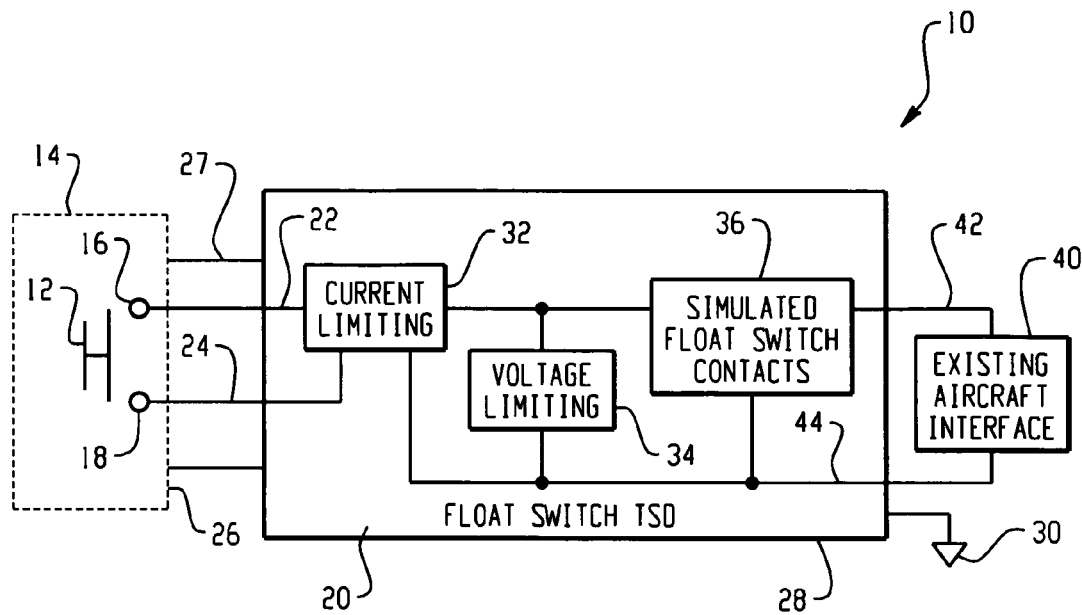
FIG. 1 is a block diagram schematic of a float switch system including a transient suppression device in accordance with one aspect of the present invention.

FIG. 1 is a block diagram schematic of a float switch system 10 including a transient suppression device in accordance with one aspect of the present invention. Referring to FIG. 1, a conventional float switch 12, which may be a magnetically operated reed switch, for example, is disposed within a container 14 containing a combustible liquid for monitoring the level thereof in the container. For the present embodiment, the container 14 may be a fuel tank of an aircraft, for example, but it is understood that the present invention is not limited in application to aircraft fuel tanks and may extend to any tank containing a combustible liquid that may be ignited by an electrical spark or the like. In any event, the float switch 12 includes contacts 16 and 18 which are electrically coupled to a transient suppression device (TSD) 20 over wires 22 and 24, respectively. The float switch 12 is operative to render an electrical connection between the contacts 16 and 18 when the liquid within the container 14 rises above or drops below a predetermined liquid or fuel level.

In one embodiment, the TSD 20 is disposed in close proximity to a wall 26 of the container, preferably on the order of twelve inches away, for example. As noted above, within the tank or container 14, the wires 22 and 24 are contained within a sealed conduit (not shown) to maintain separation from the fuel or liquid. This conduit provides a sealed passage of the wires 22 and 24 from the switch 12 to a sealable opening in the wall 26 through which they pass to the TSD 20. Between the tank wall 26 and TSD 20, the wires 22 and 24 may be contained within a conductive shield 27 which is connected at one end to the wall 26 and at the other end to a conductive enclosure 28 of the TSD 20. The enclosure 28 may be connected to an electrical ground at 30, which may be a frame or structure of an aircraft, for example. Shield 27 acts as an electrical barrier against potential threats coupling or attaching to the wires 22 and 24 by diverting any such threat energy to the aircraft frame through which it is sufficiently absorbed and mitigated.

Within the enclosure 28, the wires 22 and 24 are series coupled through a current limiting circuit or circuits 32 and a voltage limiting circuit 34 is coupled across the wires 22 and 24. The current limiting circuits 32 are designed for the present embodiment to limit the current entering the tank 14 over wire 22 and 24 to current and energy levels considered safe by the FAA. The voltage limiting circuit 34 is designed for the present embodiment to protect the circuitry of the TSD 20 against damaging voltage levels due to short duration threats, like lightning, for example. Upstream of the current limiting circuits 32 is a circuit 36 which is operative to monitor the operation of the float switch 12 and simulate the contact status to drive an interface circuit 40 accordingly. The interface circuit 40, which may be a liquid flow control valve, a relay and/or an indicator lamp, for example, may be disposed a substantial distance from the TSD 20 and coupled to the circuit 36 thereof over wires 42 and 44, for example. The drive current of the interface circuit 40 is considered unsafe by the FAA for entering the tank 14. Note that in operation, the drive current of the interface circuit 40 is conducted through the circuit 36 of the TSD 20 and does not enter the tank 14 through the float switch 12 as will become better understood from the following description.

Figure 2:
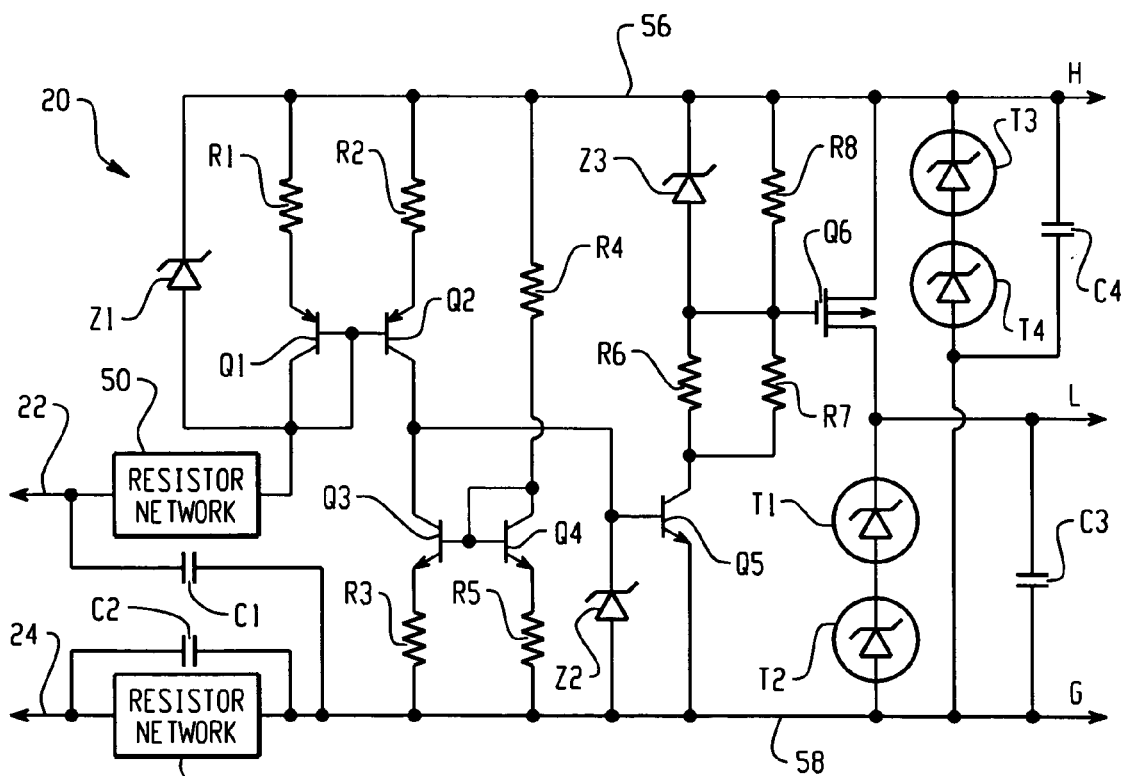
FIG. 2 is a circuit schematic of an exemplary circuit for embodying the transient suppression device.
Figure 3:
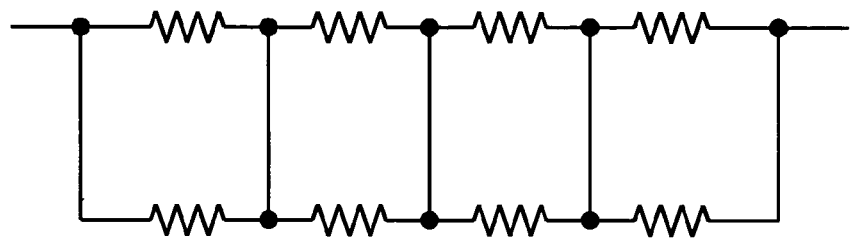
FIG. 3 is a circuit schematic of an exemplary resistor network suitable for use in the transient suppression device.

A circuit schematic of a circuit suitable for embodying the TSD 20 is depicted by way of example in FIG. 2. Referring to FIG. 2, in series with each wire 22 and 24 is an isolation resistor network 50 and 52, respectively. These resistor networks 50 and 52 afford passive isolation and voltage limiting to absorb and thus, prevent undesired or unsafe current and energy levels from entering the fuel tank 14 over wires 22 and 24 which are on the "safe side" of the TSD 20. An exemplary embodiment of a suitable resistor network for 50 and 52 is shown in FIG. 3. In the embodiment of FIG. 3, four pairs of parallel connected resistors are connected in series to form the resistor network. If the worst case in-tank fault condition is presumed to be a fifty ohm resistance between either or both wires 22 and 24 to ground, then all of the resistors of the network may be valued at approximately six thousand ohms, for example, in order to provide sufficient current limiting to the presumed in-tank fault condition. Note that at six thousand ohms per resistor, the lumped or effective resistance of each network 50 and 52 is twelve thousand ohms.

The parallel/series network embodiment of FIG. 3 was chosen based on several limitations such as, for example,: (1) the series resistance path should have a minimum physical separation to prevent arcing across a resistor body due to voltage potential, which separation being enhanced by the addition of more than one resistor to achieve the desired maximum potential voltage present; (2) a parallel path enables redundant separation to achieve an extremely improbable shorting condition; and (3) the parallel/series impedance network should survive and provide the desired safety levels when exposed to aircraft and environmental threat conditions.

Figure 4:
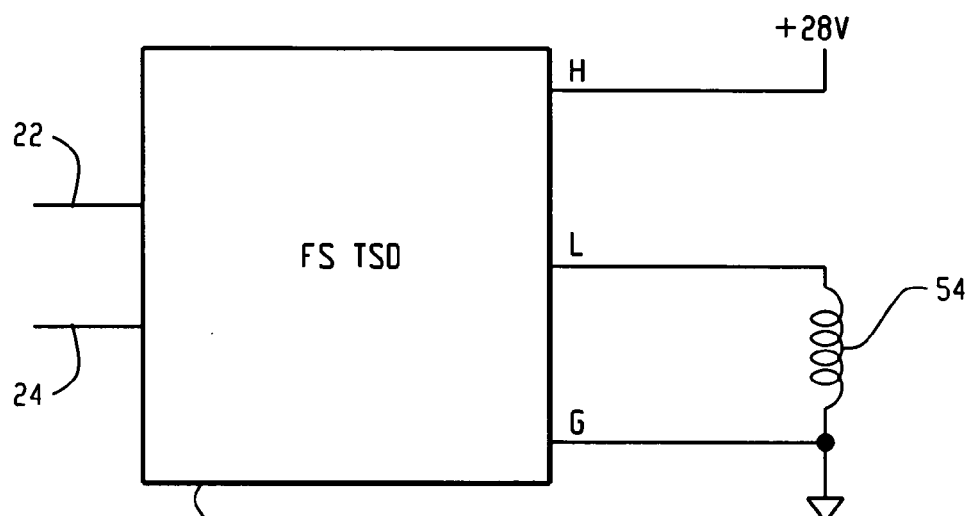
FIG. 4 is a block diagram schematic exemplifying a high side drive configuration of the transient suppression device.
Figure 5:
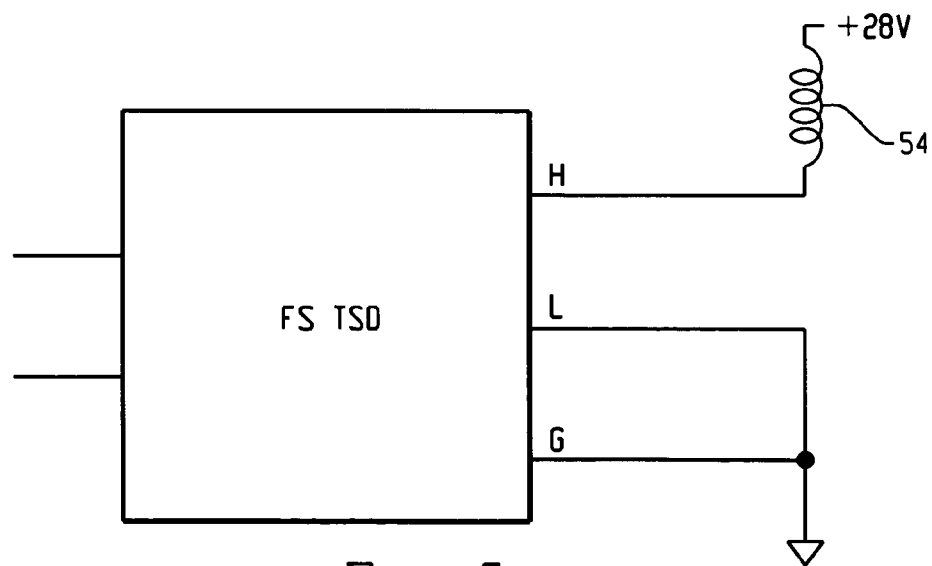
FIG. 5 is a block diagram schematic exemplifying a low side drive configuration of the transient suppression device.

Referring back to FIG. 2, the simulation circuit 36 of the present embodiment offers a high side drive connection (H) or a low side drive connection (L) to the interface circuit 40 and a return or ground connection (G). An example of a high side drive application is shown by the schematic diagram of FIG. 4 in which the interface circuit is embodied by an inductive coil 54 which may be part of a relay circuit or a solenoid for driving a flow valve, for example. In the high side drive case, a DC voltage supply which may be +28 V may be coupled to the H connection and the coil 54 may be coupled across the L and G connections. An example of a low side drive application is shown by the schematic diagram of FIG. 5 in which the interface circuit is embodied by the inductive coil 54 which may be also part of a relay circuit or a solenoid for driving a flow valve, for example. In the low side drive case, the coil 54 is coupled between a DC voltage supply which may be +28 V and the H connection and the L and G connections are coupled together.

Referring back to FIG. 2, in both foregoing described examples, the circuitry of the TSD 20 is powered by the DC voltage supply provided through the H connection to a supply bus 56 and a current return is provided by a ground bus 58 which is connected back to the supply through the G connection. Capacitors C1 and C2 are coupled from wires 22 and 24, respectively, on the safe side of the TSD 20 to the ground bus 58. One side of network 50 is connected to wire 22 and the other side is connected to a current mirror circuit comprising PNP transistors Q1 and Q2 which are coupled together through their base junctions. The collector of Q1 is coupled to its base and the other side of network 50. The emitter of Q1 is coupled to the supply bus 56 through a resistor R1 which may be on the order of 100 ohms for the present design. A zener diode Z1 is coupled cathode to anode across the supply bus 56 and collector junction of Q1 for protecting the base-emitter junction of Q1 against voltage breakdown. In addition, the emitter of Q2 is coupled to the supply bus 56 through a resistor R2 which may also be approximately 100 ohms.

Further, the collector of Q2 is coupled to another current mirror comprising NPN transistors Q3 and Q4 which are coupled together through the base junctions thereof. More specifically, the collector of Q2 is connected to the collector of Q3 and the emitter of Q3 is coupled to the ground bus 58 through a resistor R3 which may be approximately 100 ohms. The collector of Q4 is coupled to its base and to the supply bus 56 through a resistor R4 which may be on the order of 50K ohms, for example. The emitter of Q4 is coupled to the ground bus 58 through a resistor R5 which may be approximately 100 ohms. The collector of Q2 is also connected to a base of another NPN transistor Q5 which is coupled to the ground bus 58 through a zener diode Z2 which protects the base-emitter junction of Q5 against voltage breakdown. The emitter of Q5 is connected to the ground bus 58 and the collector of Q5 is coupled through a parallel connection of resistors R6 and R7 to a gate of a field effect transistor (FET) Q6 which may be a metal oxide semiconductor FET for the present design.

The gate of Q6 is also coupled to the supply bus 56 through the parallel connection of resistor R8 and zener diode Z3. The source of Q6 is connected to the supply bus 56. The drain of Q6 which is the L connection is coupled to the ground bus 58 through a parallel connection of a capacitor C3 and a pair of series connected transorbs T1 and T2 which may be of the type manufactured by International Semiconductor under the part no. SMLJ40A, for example. Moreover, the supply bus 56 which is the H connection is coupled to the ground bus 58 through a parallel connection of a capacitor C4 and a pair of series connected transorbs T3 and T4 which may be of the same type as transorbs T1 and T2. Capacitors C3 and C4 are operative to bypass electromagnetic threats to ground potential.

In operation, current of the current mirror of Q3 and Q4 is set by the resistor R4 and the voltage of the supply bus 56. For the present design, this current may be approximately one-half a milliamp. Current of the current mirror of Q1 and Q2 is set by the series resistance of the two networks 50 and 52 and the voltage of the supply bus 56. For the present design, this current may be approximately a milliamp. Accordingly, when the float switch 12 is closed, current flows through Q1 and the float switch 12 limited by the resistor networks 50 and 52. A like valued current flows through Q2 by the current mirror effect. However, since the current set to flow through Q3 is only one-half of the current flowing through Q2, the remainder of Q2 current is conducted to the base of Q5 and renders Q5 conducting.

With Q5 conducting, the voltage at the gate of Q6 is dropped sufficiently below the source voltage thereof to force Q6 into conduction. In the high side drive connection, when Q6 is conducting, the supply voltage is applied to the L connection, thus energizing the coil 54 (see FIG. 4). In the low side drive connection, when Q6 is conducting, current is permitted to flow through coil 54 from the voltage source through the H and L connections to ground return. In either case, the driving current for the interface circuit flows only through the FET Q6 and the current flowing to the float switch 12 is limited by the resistor networks 50 and 52 to less than one milliamp in the present design.

If the float switch 12 is open-circuited, no current may flow through Q1 or Q2 as a result of the current mirror effect. Since no current flows through Q2, there is no current to drive Q5 into conduction and it remains open circuited. Accordingly, the gate to source voltage of Q6 is insufficient to cause conduction thereof, and therefore, Q6 is rendered open circuited. Thus, when switch 12 is open circuited, no drive current is provided to the interface circuit 40 by the TSD 20. In this manner, under normal operation, the TSD 20 monitors the status of the float switch 12 with a minimal amount of current which is considered well within the safe levels of the anticipated FAA regulations and drives the interface circuit 40 at sufficient current levels which do not pass into the tank 14.

In the event a short duration threat, like a lightning strike or high intensity radiated pulse, for example, is coupled to one or both of the wires 42 and 44 at the unprotected side of the TSD 20, the resistor networks 50 and 52 and corresponding capacitors C1 and C2 will absorb most of the current and energy of the coupled threat. These short duration threats are not expected to last more than around 70 microseconds with a peak voltage of 1200 volts in the worst case. The current and energy which may pass through the resistor network-capacitor combination as a result of the short duration threat is expected to be well within the energy levels of the anticipated FAA regulations. The transorbs T1–T4 and capacitors C3 and C4 at the unprotected side will protect the circuitry of TSD 20 against over voltage damage as a result of and permit the circuitry to survive these short duration threat conditions.

Also, should the one or both of the wires on the unprotected side of the TSD 20 be shorted to a high voltage source, like 115 VAC, for example, for a sustained period of time, the resistor networks 50 and 52 would keep the current passed to the tank over wires 22 and 24 to levels considered safe by the anticipated FAA regulations. However, under these conditions, the circuitry of the TSD 20 may not survive.

The advantages of this aspect of the present invention are: (1) an embodiment of the float switch TSD may use inexpensive and reliable components, like resistor isolation networks, transorbs and capacitors, for example, for current and voltage limiting to protect the tank of combustible liquid from undesirable and unsafe current and energy levels under all possible conditions; (2) normal operating currents are maintained well within levels considered safe on the protected side of the TSD for monitoring the status of the float switch; and, in turn, (3) sufficient currents are provided through a simulation circuit of the TSD for driving the interface circuitry in accordance with the monitored status of the float switch.

Figure 6:
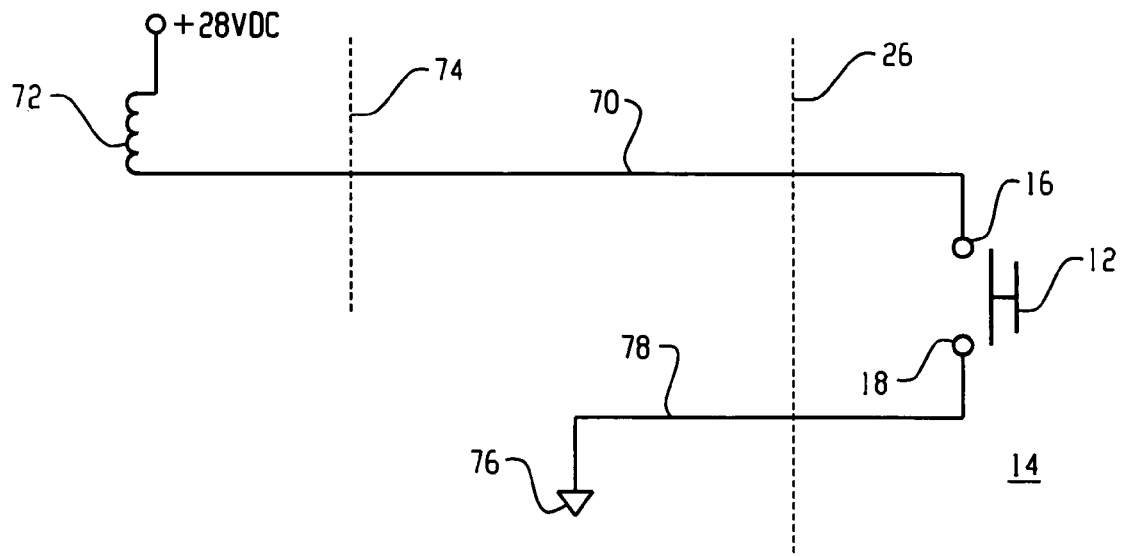
FIG. 6 is an illustration of an exemplary existing float switch system for aircraft applications.
Figure 7:
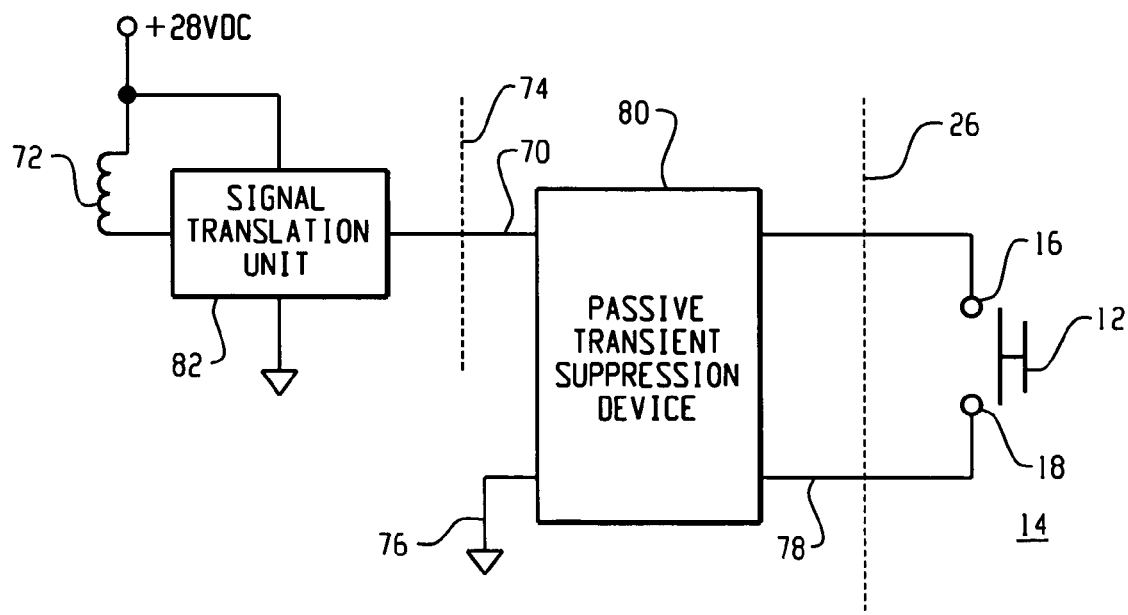
FIG. 7 is a block diagram schematic of a float switch system including a transient suppression device in accordance with another aspect of the present invention.

In some existing aircraft installations, as shown by way of example in the illustration of FIG. 6, a single wire 70 connects the coil 72 of an existing aircraft interface to one contact 16 of the float switch 12. Wire 70 passes through a pressure seal or bulkhead 74 of the aircraft and the wall 26 of the tank 14. The other contact 18 of the float switch 12 is connected to a ground 76 of the aircraft by a wire 78, the ground connection 76 being between the pressure seal 74 and tank wall 26. To install the foregoing described embodiment of the float switch TSD 20 to the existing float switch system may require adding additional wires through at least the pressure seal 74 which is a timely and costly procedure. Referring to FIG. 7, one solution to avoid this procedure and use existing aircraft wiring is to add a passive TSD 80 in series with the wires 70 and 78 between the pressure seal 74 and tank wall 26 for protecting the tank against undesirable current and energy levels. For example, the passive TSD 80 may comprise the resistor network 50 in series with wire 70, resistor network 52 in series with wire 78, and capacitors C1 and C2 connected to the ground 76, as described herein above in connection with FIG. 2.

However, for the coil 72 to operate, the voltage drop across the float switch 12 should be very small. Adding the passive TSD 80 in series with the wires 70 and 78 as proposed in the embodiment of FIG. 7 will increase this voltage drop when the switch 12 is closed, possibly to the point of rendering the interface coil 72 inoperative. So, merely adding the passive TSD 80 using the existing aircraft wiring will not solve the problem completely. To resolve this issue, an active circuit, referred to as a signal translation unit (STU), 82 may be disposed in proximity to the existing aircraft interface device 72 and powered by the same power source which may be +28 VDC, for example. The STU 82 may function to sense the status or impedance change of the float switch and TSD 80 over existing signal line 70 and in response, drive the coil 72 with a low impedance switch. Thus, by providing the drive to operate the coil 72, the STU 82 reduces the normal operating current to the passive TSD 80 to within desirable limits, allows for greater operating voltage drop across the TSD 80 and obviates the need for a pressure seal penetration to add additional wiring.

Figure 8:
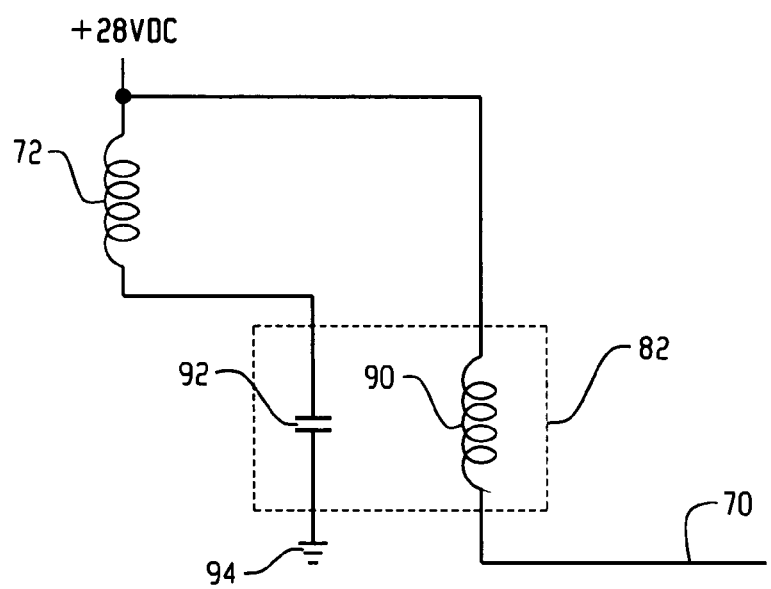
FIG. 8 is a circuit schematic of an exemplary signal translation unit suitable for use in the float switch system of FIG. 7.

In one embodiment as shown by way of example in FIG. 8, the STU 82 may comprise a micro relay 90, for example. The relay 90 may be connected between the power source +28 VDC and the existing wire 70 and include a normally open contact 92 as shown and/or a normally closed contact. The relay contact 92 may be disposed in series with the connection between the coil 72 and aircraft ground 94 in proximity to the coil 72. A drive current to operate the micro relay 90 is typically around a milliamp, for example. Thus, when the float switch 12 closes, the voltage drop across the passive TSD 80 will not defeat the operation of the relay 90. For example, if the resistance of the passive TSD is around twenty-four thousand ohms, then the voltage drop thereacross at one milliamp is approximately twenty-four volts, leaving around four volts to drive the relay 90 which is more than sufficient.

Accordingly, when the float switch 12 closes, the relay 90 is energized and contact 92 is closed permitting the coil 72 to be energized through the low impedance of the switch contact 92. When switch 12 open circuits, little or no current is conducted over wire 70 and relay 90 is de-energized, thus opening contact 92 and de-energizing the coil 72. The passive TSD 80 will limit the current and energy coupled over wire 70 to the tank 14 to safe and desirable levels under all conditions as described herein above in connection with the embodiment of FIG. 2 and the relay 90 will be protected against pulsed high energy threats over wire 70 by appropriate selection of the relay such that it is not susceptible to pulsed high energy threats.

Figure 9:
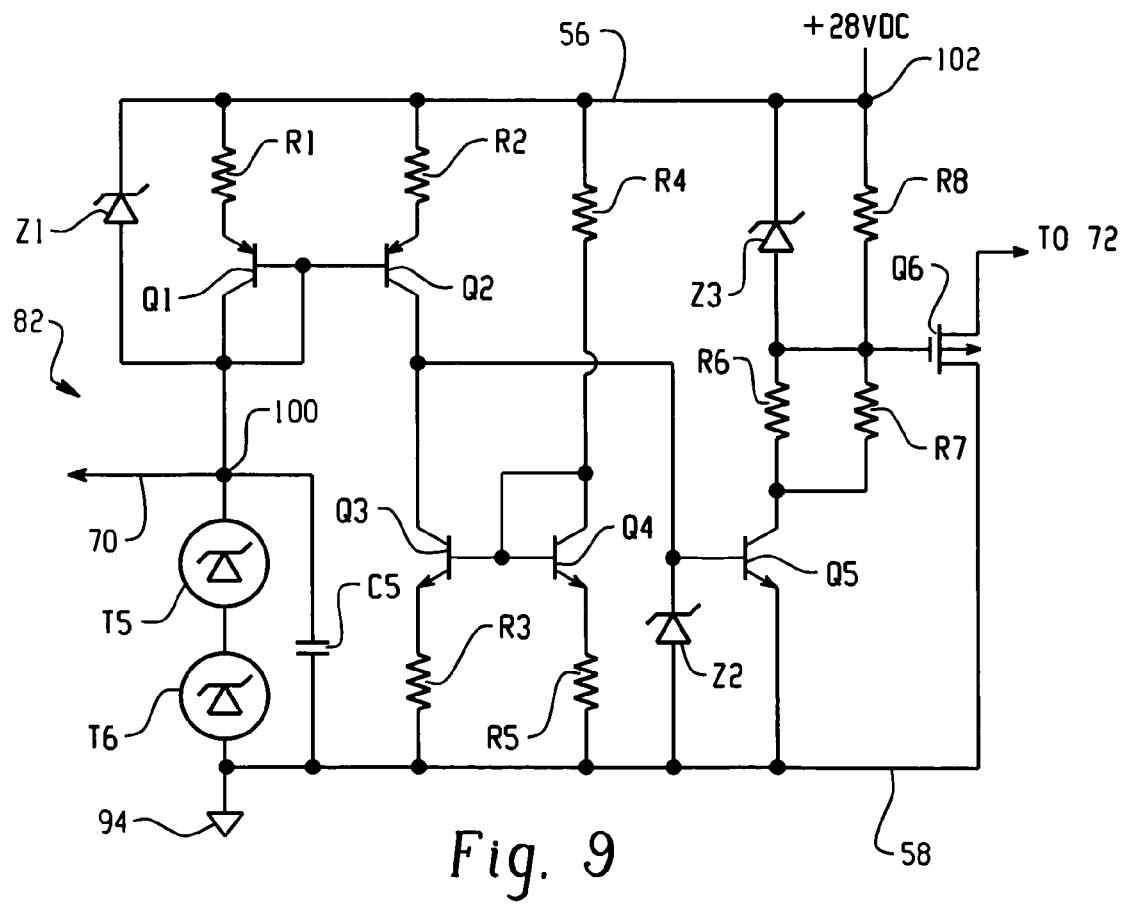
FIG. 9 is a circuit schematic of an alternate embodiment of a signal translation unit suitable for use in the float switch system of FIG. 7.

In an alternate embodiment of the STU 82 as shown by way of example in FIG. 9, current mirror circuitry similar to the circuitry described in connection with the embodiment of FIG. 2 may be included. Circuit elements common to the embodiments of FIGS. 2 and 9 will retain there reference numerals and not be described again here. Referring to FIG. 9, the collector of Q1 may be connected to the passive TSD 80, preferably the resistor network 50, over the existing wire 70 at the connection node 100. The connection node 100 may be coupled to the aircraft ground 94, which is in proximity to the coil interface 72, in series with two transorbs T5 and T6 which may be of the same type as transorbs T1–T4, for example. A capacitor C5 is coupled between node 100 and ground 94 in parallel with the transorbs T5 and T6. The power source +28 VDC, for example, is connected to the supply bus 56 at a circuit node 102 to provide power to the active circuit elements of 82. In addition, the source of MOSFET Q6 is connected to the coil 72.

In operation, the active circuit elements of 82 perform the same functions as described for the embodiment of FIG. 2. Accordingly, the MOSFET Q6 conducts current to energize coil 72 when the float switch is closed and open circuits to de-energize coil 72 when the float switch is open. Current that flows over wire 70 under normal float switch operation will be limited to the resistance of the passive TSD 80 which may be approximately one-half milliamp as described supra. Transorbs T5 and T6 and capacitor C5 protect the circuitry of 82 against transient threats coupled over wire 70, like lightning and pulsed high intensity radiated fields, for example. However, while the current and energy levels to the tank are maintained at safe and desirable levels from a steady state short of wire 70 to a high voltage like 115 VAC, for example, by the passive TSD 80, the circuitry of 82 may not survive such a threat.

In accordance with yet another aspect of the present invention, apparatus for packaging the TSD electronics is secured in place at the tank wall penetration where the float wires pass through the tank wall to the float switch disposed within the tank as described supra. An illustration of an exemplary package suitable for embodying this aspect of the present invention is shown in FIG. 10. Referring to FIG. 10, the package comprises a conductive hollow enclosure or housing 110, which may be a tube machined from brass, for example. The tube 110 is capped at one end 112 and open at the other end 114. In the present embodiment, the diameter and length of the tube 110 are approximately one inch and five inches, respectively. However, it is understood that the housing 110 is not limited to a tube shape, but may take upon other shapes without deviating from the broad principles of this aspect of the present invention.

A small aperture is provided through the capped end 112 to permit passage of the wire 70 into the housing 110 and connected to the unprotected side thereof. Once connection is made to wire 70, the TSD electronics, which may be fabricated on a printed circuit (PC) card of suitable dimensions, for example, is disposed into the tube 110 through the open end 114. Prior to insertion into the housing 110, the PC card may be coated with a protective layer, like a conformal coating, for example, to protect the TSD electronics from moisture and other contaminates, which may affect the circuits thereof. Wires 22 and 24 from the contacts of the float switch are connected to the safe side of the TSD as described above. Once wires 22 and 24 are connected to the TSD electronics, the inside of the housing 110 is fully encapsulated with an insulating compound, like an RTV™ compound, for example, to provide structural integrity to the TSD electronics.

Also in the present embodiment, a shield braid 116 encloses the wires 22 and 24 between the safe side of the TSD and tank penetration to maintain the protection thereof. One end 118 of the shield braid 116 is passed over the conductive housing 110 to form a snug fit therebetween. The end 118 of the shield braid 116 may be soldered or brazed to the conductive surface of the housing 110 to form a distributed electrical contact around the perimeter of the conductive surface of the housing 110. The shield braid 116 may be on the order of a foot to a foot and a half in length. The wires 22 and 24 penetrate the tank wall 26 through a conduit as mentioned above. As shown in the illustration of FIG. 11, a portion 120 of the conduit protrudes out externally from the tank wall 26. The other end 122 of the shield braid 116 may be slid over the conduit portion 120 and clamped in place with a conventional C clamp 124, for example, to form a distributed electrical connection around the perimeter of the conduit 120. In an aircraft, the tank wall is in contact with and supported by the aircraft frame which forms a solid and distributed ground throughout the aircraft. Thus, the shield braid 116 is in direct electrical contact with the airframe via the tank wall 26. Accordingly, with the present embodiment, current and energy coupled from the unprotected side of the TSD by a fault or threat will be dissipated to the aircraft ground via the conductive housing 110, shield braid 116 and tank wall 26, and not be coupled to the wires 22 and 24.

In addition, the housing 110 is supported in place from the tank or aircraft frame by a mounting clamp. In the present embodiment, a P type clamp 130 may be fitted over the outside mounting surface of the tube 110 and mounted to the tank wall 26 utilizing a cantilevered mounting structure 132 which may be secured to the wall 26 by bolts 134, for example. The clamp 130 and support structure 132 may offer a further electrical pathway to aircraft ground for threat and fault energy dissipation. Test point leads from the TSD PC card may be provided from the housing 110 through additional apertures in the capped end 112, for example, for testing the functionality, conductivity and system fault isolation of the TSD electronics, in situ.

Accordingly, the foregoing described packaging configuration provides for dissipative electrical shielding and mechanical structure for protection of the internal TSD electronics and an attachment surface for external mounting support. The configuration of the present embodiment offers many advantages such as: (1) the tubular housing allows the package to be structurally supported using conventional supporting hardware which permits greater flexibility in choosing mounting locations and obviates the need for unique mounting brackets; (2) it is inexpensive to manufacture; (3) it offers physically no opportunity for threats to couple into sensitive safe side wires; and (4) it provides for speedy installation with minimal aircraft modification.

While the present invention has been described herein above in connection with one or more embodiments, it is understood that such embodiments were provided by way of example and not intended to limit the invention in any way. Accordingly, the present invention should be construed in breadth and broad scope in accordance with the recitation of the claims appended hereto.

What is claimed is:

1. A transient suppression device for limiting to desirable levels current and energy entering a fuel tank of an aircraft over interface wiring that penetrates a wall of the fuel tank, said device comprising:
   an elongated, hollow, conductive housing capped at one end and open at another end, said housing being disposed external and in proximity to said fuel tank, said housing supported physically from a structure of the aircraft;
   a transient suppression circuit disposed within said housing and connected in series with said interface wiring; and
   a shield braid of conductive material disposed over the open end of said housing and covering the interface wiring over the distance between said housing and tank wall, said shield braid electrically coupling said housing to said tank wall.

2. The device of claim 1 wherein the capped end of the housing includes an aperture; wherein interface wiring that is exposed to potential threats is passed through said aperture in the capped end and connected to an unprotected side of the transient suppression circuit within the housing; and wherein interface wiring penetrating the tank wall is connected to a protected side of the transient suppression circuit within the housing through the open end of the housing.

3. The device of claim 1 wherein the housing is cylindrical in shape.

4. The device of claim 1 wherein the shield braid is fitted over the housing surface at the open end and attached to the surface around the periphery of the open end to form a distributed electrical connection.

5. The device of claim 4 wherein the shield braid is attached around the periphery of the housing surface by soldering.

6. The device of claim 4 wherein the shield braid is attached around the periphery of the housing surface by brazing.

7. The device of claim 1 wherein tank wall includes a wiring penetration opening that includes a lip which protrudes externally from the tank wall; wherein the shield braid is fitted over said lip and secured around the periphery of the lip opening to form a distributed electrical connection.

8. The device of claim 7 wherein the shield braid is secured around the periphery of the lip opening by a clamp.

9. The device of claim 1 wherein the tank wall is coupled to an aircraft ground.

10. The device of claim 1 wherein the housing is supported physically from a structure of the aircraft by a fixture including at one end a clamp which fits around a mounting surface of the housing, said fixture being secured to the aircraft structure at another end thereof.

11. The device of claim 10 wherein the fixture is cantilevered from the aircraft structure at the other end thereof.

12. The device of claim 10 wherein the fixture is cantilevered from the tank wall at the other end thereof.

13. The device of claim 10 wherein the supporting fixture electrically connects the housing to the aircraft structure which is coupled to aircraft ground.

14. The device of claim 1 wherein the transient suppression circuit is supported within the housing by an encapsulating material.

* * * * *